L. H. PERLMAN.
WHEEL.
APPLICATION FILED JUNE 29, 1906.
1,052,270.
Patented Feb. 4, 1913.
3 SHEETS—SHEET 1.
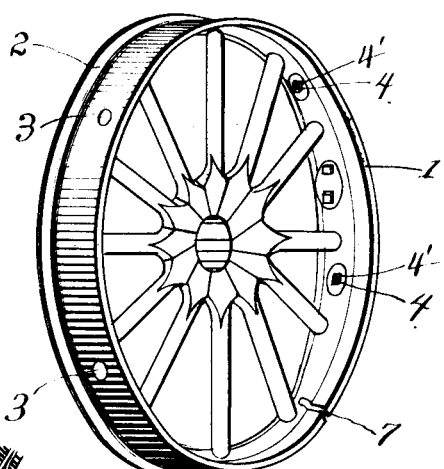
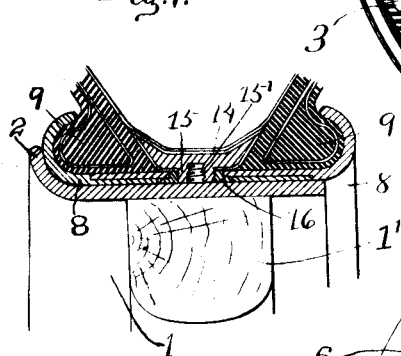
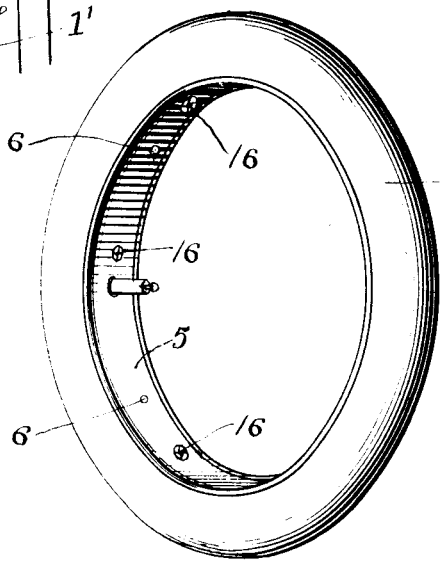
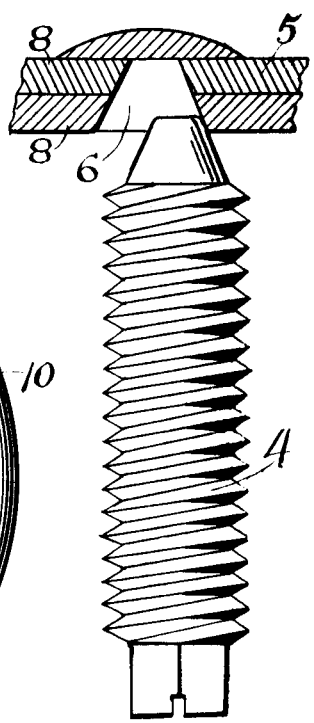
Witnesses
Inv L. M Cathran
Edgar M. Kitchin
Inventor
Louis H. Perlman
By Mason, Fenwick & Lawrence
his Attorneys.

L. H. PERLMAN.
WHEEL.
APPLICATION FILED JUNE 29, 1906.
1,052,270.
Patented Feb. 4, 1913.
3 SHEETS—SHEET 2.
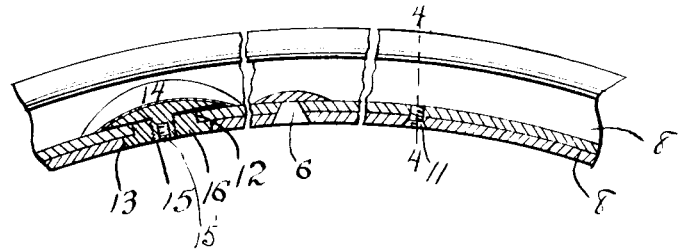
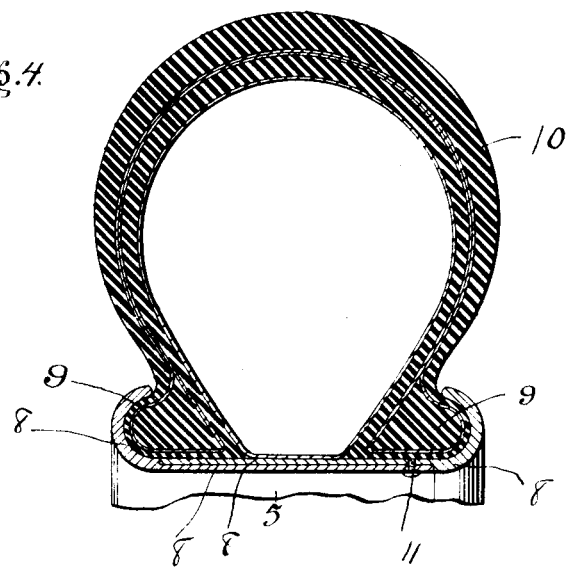
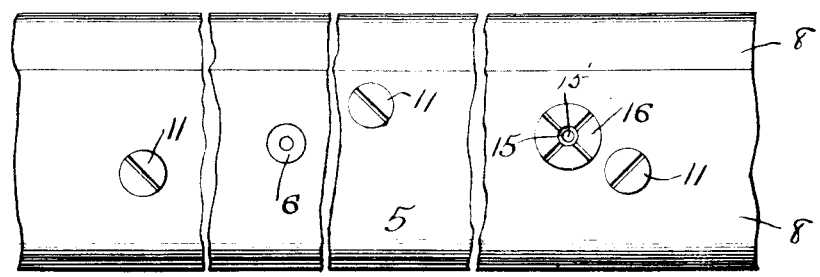
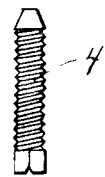
Witnesses
Jno L McCathran
Edgar M Kitchin
Inventor
Louis H Perlman,
By Mason, Fenwick & Lawrence
his Attorneys

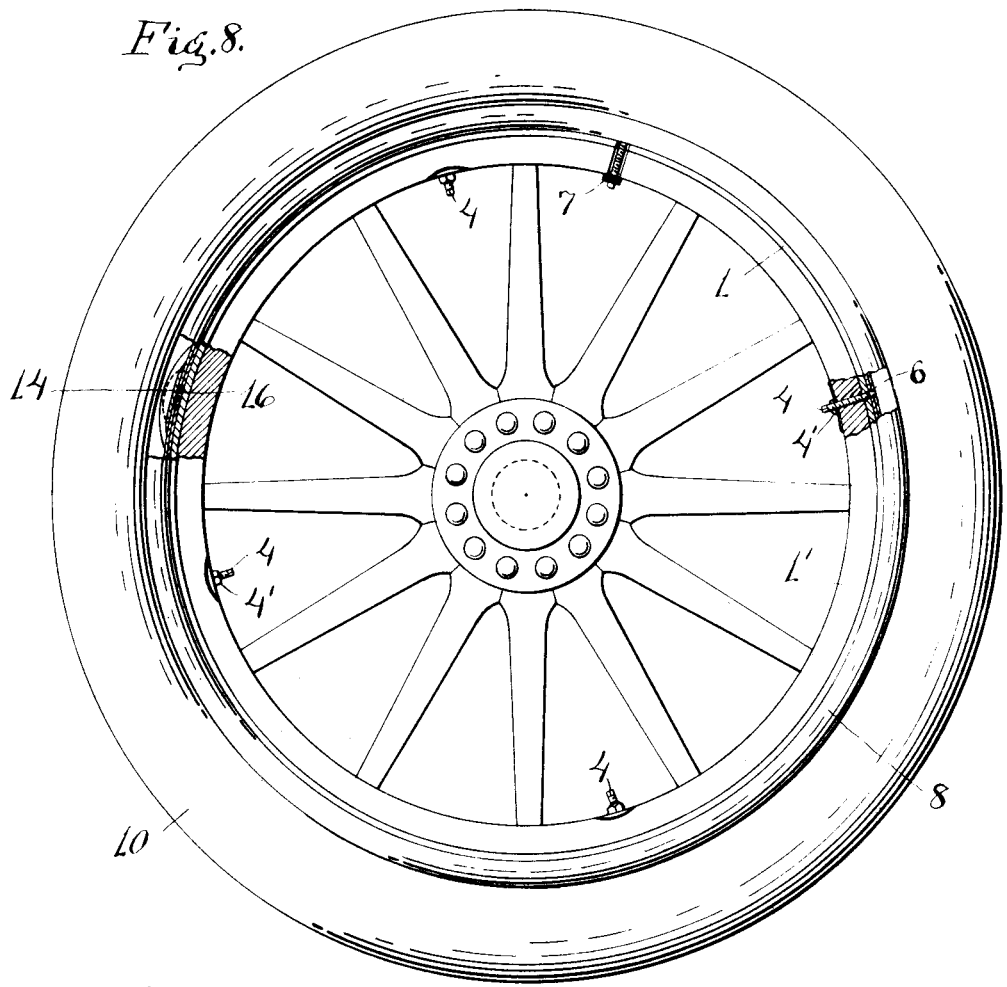

UNITED STATES PATENT OFFICE.

LOUIS H. PERLMAN, OF NEW YORK, N. Y.

WHEEL.

1,052,270.

Specification of Letters Patent.

Patented Feb. 4, 1913.

Continuation of application Serial No. 318,075, filed May 21, 1906. This application filed June 29, 1906.
Serial No. 324,045.

*To all whom it may concern:*

Be it known that I, LOUIS H. PERLMAN, a citizen of the United States, residing at New York, in the county of New York and State of New York, have invented certain new and useful Improvements in Wheels; and I do hereby declare the following to be a full, clear, and exact description of the invention, such as will enable others skilled in the art to which it appertains to make and use the same.

This invention relates to improvements in wheels and more particularly to the demountable rim type.

The object in view is the adaptation of a demountable and a fixed rim and felly for enabling ready application of the demountable rim to and removal thereof from the fixed rim and felly while sustaining a tire, and regardless of the condition of the tire.

A further object in view is the provision of a demountable rim capable of being readily removed from and applied to the fixed rim and felly of a wheel, the demountable rim being constructed to facilitate the application and removal of a shoe.

The invention comprises certain novel constructions, combinations and arrangements of parts, as will be hereinafter fully described and claimed.

In the accompanying drawing,—Figure 1 is a perspective view of a wheel body embodying features of the invention. Fig. 2 is a similar view of the demountable rim embodying the features of the present invention and showing the shoe applied thereon. Fig. 3 is a transverse axial section through a fragment of the rim seen in Fig. 2. Fig. 4 is a transverse section taken on the plane indicated by line 4—4 of Fig. 3. Fig. 5 is an inverted plan view of a fragment of the rim. Fig. 6 is a view in side elevation of one of the retaining bolts. Fig. 7 is a transverse, vertical section through the felly, fixed rim, demountable rim, shoe and clamping plate therefor. Fig. 8 is a view in side elevation of a wheel embodying the invention, parts being broken away for illustrating interior parts in section. Fig. 9 is a transverse section taken on a longitudinal plane of the axis passing through one of the connecting devices, parts being seen in elevation. Fig. 10 is a plan view of one of the clamping plates or lugs detached. Fig. 11 is an enlarged, detail, fragmentary section showing one of the locking bolts in the act or process of entering a recess while positioning the demountable rim on the wheel body, surrounding parts being omitted.

This application is a continuation of and substitute for my previously filed application Serial No. 318,075, filed May 21, 1906, the present invention comprehending all of the principles therein disclosed with additional details. Thus, as above intimated, this invention comprehends a wheel whose demountable rim is bodily detachable from its fixed rim and felly, means being provided for firmly and rigidly retaining the demountable rim on the fixed rim and felly while in use, such means at the same time being adapted to be manipulated for enabling ready and easy removal of the demountable rim when desired.

In Fig. 1, I have shown a wheel body such as is disclosed in my former application above referred to. The said wheel body is of course provided with the usual hub and spokes and a felly 1', which felly may be formed of any desired material, as a ring of wood upon which has been shrunk a metallic ring constituting the fixed rim, but the rim and felly may obviously be otherwise constructed as desired. Rim 1 is formed with an annular flange 2 at one edge, and the body of the rim is formed intermediate of its edges with threaded apertures 3—3 spaced apart at suitable intervals. Through the apertures 3 are threaded bolts 4—4, each of which bolts, as seen in Fig. 6, is formed with a conical or frusto-conical entering end.

The demountable rim 5, which will be fully hereinafter described, is formed with conical or frusto-conical apertures 6—6 designed, when the rim is applied to the felly, to be brought into register with the apertures 3. The rim 5 is applied to rim 1 simply by being slid axially onto the same from that edge thereof not provided with the flange. After the rim 5 has been applied, the bolts 4 are threaded home sufficiently for entering apertures 6 and locking the demountable rim firmly in place, the tapered end of each of the bolts enabling the same to readily enter the respective aperture 6. Any suitable locking nuts 4' or other means may be provided for preventing loosening of the bolts 4 as desired. The bolts 4 thus serve as connectors between the wheel body and the demountable rim, and are adapted to exert outward radial pressure on the rim. The felly and fixed rim are provided with a transverse notch 7 for accommodating the valve stem of the shoe carried by the rim 5 when said rim is slid laterally into place.

The rim 5 is formed, as clearly seen in Figs. 3 and 4, of circumferential sections 8—8 each provided at its outer edge with a longitudinal and circumferential clencher flange curved to produce an annular groove designed to receive the annular bead 9 at the edge of a shoe 10. Each of the sections 8 is cut away for a portion of its thickness, forming an annular shoulder, and one of the sections overlaps the other for the width of the cut away portion with the free edge of each lapping portion engaging the shoulder of the other portion. At suitable intervals throughout the circumference of the rim, the sections 8 are secured together by screws 11—11 which extend from the inside through the inner section and are threaded into the outer section. The screws 11 together with the shoulders produced by the cut away portions of sections 8 serve to rigidly connect the sections together for constituting a firm rigid rim in use. However, the said screws 11, when the rim is removed from the felly and fixed rim 1, may readily be withdrawn and the sections of the rim separated laterally for permitting the removal of the shoe 10 and the replacing of another shoe. By preference, the screws 11, as seen in Fig. 5, are arranged in staggered relation about the rim for preventing weakening of the sections of the rim.

At various points about the periphery of the rim 5, the same is provided with post receiving apertures, the upper or outer section 8 being formed with a comparatively small aperture 12 and the inner or lower section being formed with the larger aperture or recess 13 concentric with the aperture 12, the apertures 12 and 13 constituting the post receiving apertures the smaller opening providing an annular shoulder. A clamping plate or shoe retaining block 14 is arranged above each of the post receiving apertures and a post or stem 15 projects inwardly from the said plate 14 through said apertures. The post 15 is provided with an implement receiving threaded socket 15' and the post is engaged by a nut 16 of a size and shape for snugly fitting within the apertures 12 and 13 and to rest on the annular shoulder. The said apertures 12 and 13 are preferably circular and the nut is therefore made in the form of a disk and its inner face is grooved radially for receiving an operating tool or spanner. As many of said clamping blocks or plates 14 each with the coöperating elements of the respective set of clamping devices are provided as are found desirable. Each of the said clamping plates engages the inside of the shoe 10 and firmly presses the same into position with the beads 9 in the grooves produced by the flanges at the edges of the rim. The engagment of the nut 16 with the outer section 8, when the nut is threaded home, insures a firm clamping action of the block 14.

When applying the demountable rim to the fixed rim, it is to be noted that the valve stem constitutes a guide as it enters the notch 7. This guide insures the registration of apertures 3 and 6, but it is of course possible that the notch 7 may wear or the notch may be originally made slightly larger than the diameter of the valve stem, and therefore the demountable rim may be applied in such a position that the apertures 6 are brought only to a partial registration with apertures 3. In such instance the tapering end of the bolt 4 enters the respective aperture 6 and the beveled surface of such tapered end wedges against the beveled surface of the aperture and causes the rim to adjust itself on the felly.

I have employed the term "shoe" and by the term I refer to the elastic casing constituting the tread, and inclosing an inner air-containing casing, and ordinarily referred to as a tire. The shoe is of the type illustrated, being circumferentially divided and having marginal beads extending radially and axially for being engaged and retained against outward axial or radial movement by the clencher flanges. The shoe disclosed in the drawing and preferably employed is of the clencher type well known on the market, but of course it will be understood that any form of shoe may be employed.

Flange 2 serves simply as a retaining stop in applying the demountable rim and as an extra precaution against inward shifting of the rim in operation, thus taking some of the strain off of bolts 4, and hence said flange may be constructed in various forms or any suitable substitute may be employed in its stead.

The retaining nuts, 16, are, in operation, threaded home for tightly clamping the shoe in place, and, when so positioned, lie with their inner faces flush with the inner face of the rim, so as to leave the inner face of the rim substantially smooth and continuous for easily and freely sliding onto and off of the felly when the bolts 4 are withdrawn.

In applying a shoe to the demountable rim, without disconnecting the sections of the rim, one edge or bead is applied over one of the clencher flanges of the rim, and is pressed as far across the rim toward the other flange as possible, and the operator then introduces the several plates or lugs 14 into the shoe, each plate, as it is introduced, being disposed with its stem or post directed toward one of the apertures 12, and an instrument, such as a bolt, is passed through the respective opening formed by the given registering apertures 12 and 13, the inner end of each bolt-like tool being threaded into the socket 15' of the stem 15 of the respective lug or plate 14. Next the inner tube is introduced into the shoe and positioned to surround the rim within the shoe, the valve stem of the inner tube being properly disposed through an appropriate aperture in the demountable rim, clearly seen in Fig. 2. Then the several bolt-like tools are pressed longitudinally outwardly for moving the lugs or plates 14 out into the surrounding shoe for leaving a clearance for the application of the other marginal bead which is then forced over the adjacent clencher flange. All of the bolt-like tools are drawn inwardly until the stems of the lugs 14 project into the apertures of the demountable rim. The inner tube is then inflated in the usual manner, and the nuts 16 are applied to the several stems of lugs 14. Obviously, when the sections of the rim are separated for applying the shoe, the operation will be substantially the same as above described, except that the marginal beads will not have to be forced over the clencher flanges. If each of the bolt-like tools is of sufficiently small diameter to allow nut 16 to pass over the same, said nut may be threaded home onto bolt 15 without removing said tool, and the clamping plate 14 positively held while being engaged and the tool subsequently removed, but if the tool is too large to admit of this application, the tool may be removed after the plate 14 has been drawn into position, and the nut subsequently applied. Obviously, the operation of seating and securing each plate 14 will be the same as every other, and the essential feature of the operation is the introduction of a tool through the rim into the shoe to engage the plate or a part thereof and position the plate and its bolt for application of the nut, and it will furthermore be observed that while bore 15' has been especially designed to receive the tool other means of connection between the tool and clamping plate may be provided within the spirit and scope of the invention.

For purposes of interpretation of the appended claims, I wish it understood that in employing the term "demountable", I refer solely to the capacity of the rim to be removed or demounted from the body of the wheel and do not refer to the structure of the rim *per se*.

Fig. 3 is a section taken at random and showing circumferential fragments of any parts of the rim, as is also the showing seen in Fig. 4 a transverse section taken across the rim at any point where there happens to appear a screw or bolt 11. It hence becomes apparent that the material of the rim is of uniform thickness throughout, even the portions of the respective sections constituting the rim which lap being rendered sufficiently thin to cause the lapping portions when united by the bolts 11 to present a thickness equal to and uniform with the thickness of the material of the rim at any other place. This uniformity of thickness is due to the method of manufacture and affords among its many advantages that of lightness, durability, and ease and cheapness of production as compared with rims of the cast metal type which may be given a sufficiently great thickness to accommodate any desired kind of shoe clamping devices, but which necessarily involve in their production the expenses incident to machining in addition to the relatively high cost of casting as compared with rolling. Thus it becomes obvious that in the provision of clamping devices for the shoe of a pneumatic tire applied to a rim of the type disclosed, that is having uniform and relatively thin thickness throughout its area, the mere adaptation of known clamping devices is not possible, as the clamping devices must be such as are susceptible of utilization without requiring additional thickness or enlargements at various points about the rim. It was for the solution of this difficulty arising from the utilization of such a rim as is herein disclosed that the present invention was produced by which the shoe of a pneumatic tire of the type specified may be firmly clamped with facility on a rim whose material is of uniform thickness throughout.

Each bolt 4, in being threaded home to a seating of its frusto-conical outer end, wedges the demountable rim and at the same time exerts a radial outward pressure thereon tending to prevent the demountable rim from arriving at or maintaining a sufficiently intimate contact with the fixed rim as to become rusted thereon or otherwise tightly engaged therewith. Obviously, the wedging action of the tapered end of the bolt is not circumferential only, but, when the demountable rim has not been brought into accurate axial alinement with the engaged parts of the wheel body, also acts as a wedge to force the demountable rim axially to its final position, as in the instance of a threading home of the bolts 4 after the rim has been applied sufficiently for the tip of the outer end of each bolt 4 to enter the respective recess 6 without the rim, however, being fully or accurately seated against the annular flange or stop 2.

Having thus fully described my invention, what I claim as new and desire to secure by Letters Patent is:

1. In a wheel, the combination with a wheel body having an annular abutment, of a rim composed of overlapping separable sections secured together and proportioned to be slidably mounted upon the wheel body and into contact with the abutment, fastening means inserted through both laps of and wholly countersunk within the rim, and means to secure the rim upon the wheel body.

2. In a wheel, a rim provided with a recess having an annular shoulder, of an engaging plate having a stem provided with an implement receiving opening, and a fastening means proportioned to be seated upon the shoulder within the recess and adapted to engage the stem for retaining the plate.

3. In a wheel, a rim comprising overlapping sections, and having axially registering recesses formed in the overlapping portions, an engaging plate having a stem provided with an implement receiving opening, and fastening means adapted to engage the stem and fit and be seated wholly within the registering recesses.

4. In a wheel, the combination with a wheel body, of a rim proportioned to be slidably mounted upon the wheel body, said rim comprising separable sections detachably secured together, tire fastening means inserted through both sections of the rim and countersunk therein, and means for detachably securing the rim on the wheel body.

5. In a wheel, the combination with a wheel body, of a rim adapted to be moved axially into and away from an operative position on the wheel body, said rim having substantially radial flanges for positively engaging the beads of the shoe of a pneumatic tire, and said rim comprising separable sections detachably secured together, tire fastening means extending through both sections of the rim, and means for detachably securing the rim to the wheel body, said wheel body having a substantially continuous and uninterrupted periphery, and the rim having a similar inner surface substantially uninterruptedly paralleling the periphery of the wheel body.

6. In a wheel, a wheel body, a rim adapted to be moved axially into and away from an operative position on the wheel body, said rim having means for positively engaging the shoe of a pneumatic tire, a clamping plate independent of and adapted to clamp the shoe of a pneumatic tire to the rim, said plate being shaped to prevent independent rotation of itself when clamping the shoe and having a stem formed with means for receiving a positioning tool, and threaded means adapted to engage the stem and the rim for effecting a clamping action of the clamping plate.

7. In a wheel, a wheel body, a rim adapted to be moved axially into and away from an operative position on the wheel body, said rim having means of positive engagement for the shoe of a pneumatic tire, and said rim having a recess, a clamping plate independent of the rim and adapted to clamp a pneumatic tire to the rim, said plate having a stem formed with means for receiving a positioning tool, and threaded fastening means adapted to engage the stem and the rim and to extend into the recess of the rim for effecting a clamping action of the plate.

8. The combination of a demountable rim having radially disposed clencher flanges, a tire shoe having beads engaging said flanges, a wedge-shaped clamping plate bearing against said beads and adapted when moved to force said beads against said flanges, and means accessible from the inside of the rim for drawing the clamping plate radially toward the rim.

9. The combination of a sectional demountable rim having radially disposed clencher flanges and overlapping perforated portions, a tire shoe having beads engaging said flanges, a wedge-shaped clamping plate bearing against said beads adapted when moved to force said beads against said flanges, the clamping plate having a threaded stem extending through the perforations in the overlapping portions and a nut for said stem bearing against an inner face of the rim.

10. The combination with a wheel and its felly, of a laterally demountable rim therefor having a substantially conical recess therein, and a radially movable screw mounted in a fixed portion of the wheel structure and having a substantially conical tip that is adapted to enter said recess and to act, as a wedge, laterally upon the rim and move it axially of the wheel.

11. The combination, with a wheel body, of a demountable rim therefor, a locking element, having a tapering portion, that is adapted to be moved radially and to thereby exert pressure against the rim outwardly radially of the wheel body, and to act as a wedge laterally, said locking element having an engagement with the wheel body whereby it may be moved radially of the wheel body.

12. The combination with a wheel and its felly, of a demountable rim therefor, a locking element having a tapering end that is adapted to be moved radially and to thereby act as a wedge laterally and exert pressure against said rim radially of the wheel, said locking element having a threaded engagement with the wheel structure whereby it may be moved radially of the wheel.

13. The combination, with a wheel body, of a demountable rim therefor, and a locking element, having a tapering portion, that is adapted to be moved to exert pressure against the rim outwardly radially of the wheel body, and to act as a wedge laterally, said locking element having an engagement with the wheel body.

In testimony whereof I hereunto affix my signature in presence of two witnesses.

LOUIS H. PERLMAN.

Witnesses:
 EDGAR M. KITCHIN,
 HUGO MOCK.